United States Patent [19]

Singh et al.

[11] Patent Number: 5,077,239

[45] Date of Patent: Dec. 31, 1991

[54] CHALCOGENIDE GLASS, ASSOCIATED METHOD AND APPARATUS

[75] Inventors: Narsingh B. Singh; Richard H. Hopkins, both of Murrysville; Walter E. Gaida, East Pittsburgh; Robert Mazelsky, Monroeville, all of Pa.

[73] Assignee: Westinghouse Electric Corp., Pittsburgh, Pa.

[21] Appl. No.: 465,285

[22] Filed: Jan. 16, 1990

[51] Int. Cl.$^5$ .................. C03C 13/04; C03C 3/32; C03C 4/10; G02B 6/14

[52] U.S. Cl. ...................... 501/40; 501/37; 501/41; 501/900; 501/904; 385/141

[58] Field of Search .................. 350/96.31, 96.1; 501/37, 40, 900, 904, 905

[56] References Cited

U.S. PATENT DOCUMENTS

| | | | |
|---|---|---|---|
| 2,986,527 | 5/1961 | Redfield et al. | 252/300 |
| 3,121,208 | 2/1964 | Karlson et al. | 501/40 |
| 3,312,922 | 4/1967 | Eubank et al. | 501/40 |
| 3,363,962 | 1/1968 | Vogel | 350/2 |
| 3,655,255 | 4/1972 | Krause et al. | 350/1 |
| 3,766,080 | 10/1973 | Swinehart et al. | 252/300 |
| 3,825,439 | 7/1974 | Tick | 117/106 R |
| 3,901,996 | 8/1975 | Hasegawa et al. | 428/426 |
| 3,981,818 | 9/1976 | Swinehart et al. | 252/300 |
| 4,007,096 | 2/1977 | Jasinski et al. | 204/1 |
| 4,072,782 | 2/1978 | Kramer et al. | 428/409 |
| 4,154,503 | 5/1979 | Lettington et al. | 501/904 |
| 4,237,200 | 12/1980 | Weddigen | 429/102 |
| 4,269,935 | 5/1981 | Masters et al. | 430/323 |
| 4,276,368 | 6/1981 | Heller et al. | 430/323 |
| 4,303,635 | 12/1981 | Aldinger et al. | 423/561 |
| 4,371,232 | 2/1983 | Gensen et al. | 350/1.4 |
| 4,397,520 | 8/1983 | Neil | 350/1.4 |
| 4,398,786 | 8/1983 | Neil | 350/1.4 |
| 4,411,488 | 10/1983 | Neil | 350/1.4 |
| 4,432,217 | 2/1984 | Ochsner | 68/5 D |
| 4,486,069 | 12/1984 | Neil | 350/1.2 |
| 4,494,819 | 2/1985 | Ladwell | 350/1.4 |
| 4,550,074 | 10/1985 | Tzinis et al. | 430/322 |
| 4,557,914 | 12/1985 | Modone | 423/303 |
| 4,602,342 | 7/1986 | Gottlieb et al. | 364/498 |
| 4,708,942 | 11/1987 | Nishiii et al. | 501/40 |
| 4,733,940 | 3/1988 | Broer et al. | 350/96.31 |
| 4,737,012 | 4/1988 | Murakami et al. | 350/96.23 |

FOREIGN PATENT DOCUMENTS 0100407 2/1984 European Pat. Off. .

OTHER PUBLICATIONS

J. D. Fiechtner et al., "On the Preparation and Properties of Some Non-Oxide Chalcogenide Glasses", *Infrared Physics* 14:3-7 (1974).

Hilton et al., "New High Temperature Infrared Transmitting Glasses-II", *Infrared Physics* 4:213-221 (1964).

Savage et al., "Chalcogenide Glasses Transmitting in the Infrared Between 1 and 20µ—A State of the Art Review", *Infrared Physics* 5:195-204 (1965).

Primary Examiner—William R. Dixon, Jr.
Assistant Examiner—Michael Marcheschi
Attorney, Agent, or Firm—W. G. Sutcliff

[57] ABSTRACT

A crystal of a composition of silver, thallium, and sulfur is useful in non-linear optical devices, acousto-optical devices, piezo electric devices and other types of optical and acoustic devices. The chalcogenide glass composition of the invention displays superior transmission beyond 12 µm.

12 Claims, 5 Drawing Sheets

Fig. —Infrared transmission of impure $AgTlS_2$ glass

Fig. —Infrared transmission of purified AgTlS$_2$ glass

CHALCOGENIDE GLASS, ASSOCIATED METHOD AND APPARATUS

BACKGROUND OF THE INVENTION

1. Field of the Invention

The present invention relates to a chalcogenide glass, and more specifically to a chalcogenide glass of $AgTlS_2$ suitable for use in infrared optical devices.

2. The Prior Art

Various attempts have been made to produce broad band infrared transmissive chalcogenide glasses but only arsenic trisulfide ($As_2S_3$) has proved suitable for commercial applications. See, for example, J. A. Savage and S. Nielsen, Infrared Physics 5, 195, (1965); and A. R. Hilton, C. E. Jones, and M. Brau, Infrared Physics 4, 213 (1964). Since the IR transmission range of the oxide glasses is very much limited by the metal-oxide structural vibrations, attempts have been made to improve the physical and chemical properties of IR glasses by employing compositions that contain selenium, tellurium and sulfur. Selenide and telluride glasses containing Tl, Sb and Cu have been studied but have very low softening temperatures and low transmittance. See, *The Structures of Glass*, Vol. 2, Proceedings of the Third all Union Conference on Glassy State, Leningrad 1959.

Increasing demands for IR glasses for a variety of applications including infrared windows, laser beam selectors, laser beam deflectors and fiber-optic transmission lines indicate a need to provide a glass capable of transmitting up to the longer wavelengths, such as 1-5 and 8-14 $\mu$m atmospheric windows.

In spite of these disclosures, there remains a need for a economical chalcogenide glass which transmits beyond 12 $\mu$m and which provides superior illumination, ranging and handling in the 1-5 and 8-14 $\mu$m atmospheric windows.

SUMMARY OF THE INVENTION

The present invention has met the above described needs by providing a new chalcogenide glass which transmits beyond 12 $\mu$m. Specifically, the glass is prepared from a composition of silver, thallium and sulfur. The method of preparing this glass is simple and economical compared to the glasses of the prior art. The glass exhibits good chemical durability when immersed in water and very dilute acids and bases. The glass does not react with concentrated hydrofluoric acid.

It is an object of the present invention to provide a new chalcogenide glass.

It is another object of the present invention to provide a chalcogenide glass that is prepared from a silver, thallium and sulfur composition.

It is a further object of the present invention to provide a chalcogenide glass that may be used in optical devices.

It is yet another object of the present invention to provide a method of making a chalcogenide glass.

It is an object of the present invention to provide a chalcogenide glass that may be used as a waste container.

It is a further object of the present invention to provide a chalcogenide glass that may be used in AOTF devices.

These and other objects of the present invention will be more fully understood from the following description of the invention.

DESCRIPTION OF THE PREFERRED EMBODIMENTS

The present invention provides a chalcogenide glass composition of silver, thallium and sulfur in a glass formable ratio of x moles of silver, y moles of thallium and z moles of sulfur, where $x+y+z$ is about 4 and $z=$about 2x and about 2y. More specifically, silver is present in an amount of about 1 atomic part, thallium is present in an amount of about 1 atomic part and sulfur is present in an amount of about 1.9 to 2.3 atomic parts. The glass is a solid having two plane optical surfaces which are generally parallel. The glass of the present invention has a third plane surface which is generally perpendicular to at least one of the two plane optical surfaces.

Glass prepared according to this invention can be used in a variety of optical, acoustic, and acousto-optical devices including optical spectrometers, nonlinear optical devices and the infrared, such as laser frequency converters, optical parametric oscillators, mixers and harmonic generators. Acousto-optical devices such as tunable filters disperse of light filters and brag cells may also be used. In addition, piezo electric devices such as acoustic delay lines may be used.

Specifically, the solid glasses third plane surface may have an acousto-optical transducer mounted thereon. Alternatively, the glass may be in the form of an optical fiber. The ends of the fiber would be optical faces which would be generally perpendicular to the fiber.

Figure 1:
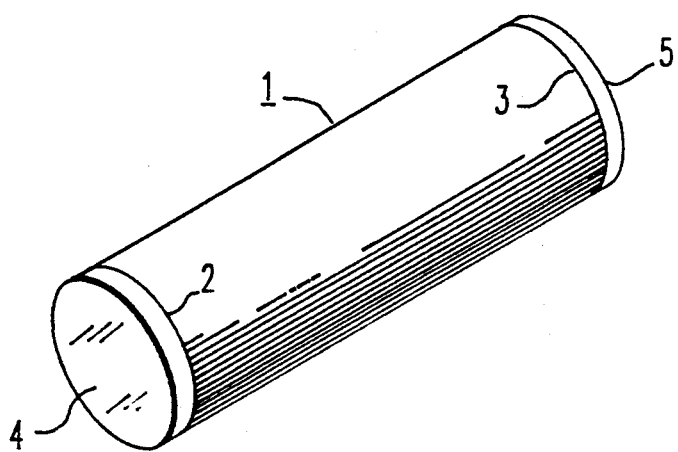
FIG. 1 is a diagrammatic view of a certain presently preferred embodiment of a non-linear optical rod according to this invention.

In FIG. 1, rod 1 glass according to this invention, has polished faces 2 and 3 which are covered with antireflective coatings 4 and 5, respectively. This rod could be used in devices such as laser frequency converters, where light enters the crystal through one optical face and exits the crystal from the opposite optical face at a different frequency.

Figure 2:
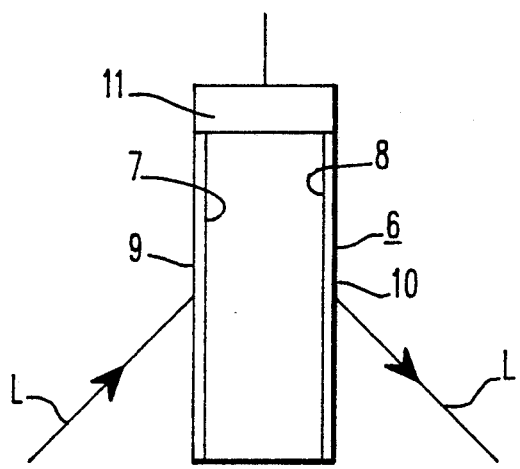
FIG. 2 is a diagrammatic view of a certain presently preferred embodiments of an acousto-optical tuneable filter made from a crystal according to this invention.
Figure 3:
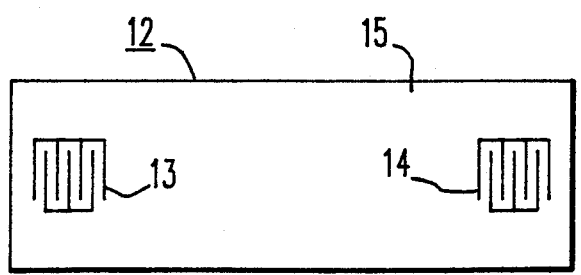
FIG. 3 is a plane view showing a certain presently preferred embodiment of an acoustic delay line employing a crystal according to this invention.

In FIG. 2, rod 6 of the glass according to this invention, has optical faces 7 and 8 which are coded with antireflective coatings 9 and 10 respectively. Mounted to one side of rod 6 is transducer 11, which generates acoustio waves in the glass that correspond in frequency to the frequency of the electricity impressed upon transducer 11. Light L enters one face of the crystal and exits the other face of the crystal modulated in some way by the acoustic waves, such as being defracted polarization rotated or frequency shifted. In FIG. 3, a rod 12 of a glass according to this invention, has sending transducer 13 and receiving transducer 14 mounted on polished surface 15 and electrical signal sent to transducer 13 produces surface acoustic waves in crystal 12 which travel to receiving transducer 14 where they are reconverted into an electrical signal.

The glasses included within the scope of this invention are silver thallium disulfide preferably in orthorhombic crystalline form.

The glass can be made in a variety of ways known to those skilled in the art, but the preferred technique is the Bridgman method. In the Bridgman method, amounts of the solid elements in the proportions required to form a crystal are weighed out, melted together and cooled to form a homogeneous bar. The bar is placed in a sealed quartz glass tube also known as a growth tube, that has a single crystal seed of some of the same crystal structure at the bottom. The bar is then melted. The bar is then very slowly solidified, beginning with the portion that is next to the capillary. This is called "directional freezing" and can be accomplished in a furnace by slowly lowering the growth to be down through the furnace or by raising the furnace up over the tube.

The Bridgman technique is preferred to other methods of preparation because the melt is enclosed. Sulfur has a significant vapor pressure at the melt temperature and if the melt is not enclosed, the escape of this element will alter the melt composition and may result in the inclusion of a second phase in the crystal.

Elemental silver, thallium and sulfur were weighed in a ratio of about a 1:1:2 composition. The elements were of 5N purity. However, some additional purification of thallium and silver was carried out following the methods of N. B. Singh et al., *J. Material Science*, herein incorporated by reference. The elements were homogenized at about a temperature of 1050° C. for a time period of about 3 to 4 hours and more preferably about 12 hours. The mixture was cooled to room temperature in the furnace.

The prereacted $AgTlS_2$ was evacuated to about up to $10^{-7}$ torr in a quartz-glass growth tube of the Bridgman type and sealed. The ampoule was placed in a transparent Bridgman-Stockbarger furnace which was fabricated from nichrome wire wrapped on a quartz tube. A high temperature gradient was maintained in the furnace of about a 140° C./cm. The sample ampoule was then lowered through the furnace at a controlled gradient of about 1 cm/day. A sample of the glass prepared by this method is shown in FIG. 4. Transmission data taken with a Perkin Elmer Model 330 and a Nicolet Model 7199 indicated that the glass transmitted from 0.8 to over 13 μm with absorption bands at 2.3, 5.8, 7.0, 8.7 and 10.5 μm which is attributed to the hydroxide, carbon, sulfur and oxide impurities. When corrected for reflection, transmittance was 52%.

The following examples further illustrate this invention.

EXAMPLE 1

The following compositions were prepared using solid metal elements.

| Element | Atomic Fraction |
|---|---|
| Silver | 1 |
| Thallium | 1 |
| Sulfur | 2 |

The elements required to make each composition were placed in a quartz tube and were heated to about 700° C. for about 4½ hours to form homogeneous melts. The melts were cooled to room temperature to form bars 10 cm long and 2.5 cm in diameter. Each bar was placed in a quartz grown tube having a single crystal of silver thallium disulfide at the bottom; each bar was melted. The growth tubes were placed in Bridgman furnaces and were lowered to cool the melt at a temperature gradient of about 53° C./cm at a growth rate of about 1 cm/day. Sections of the glass about 5 cm long were prepared and the faces were optically polished.

Figure 4A:
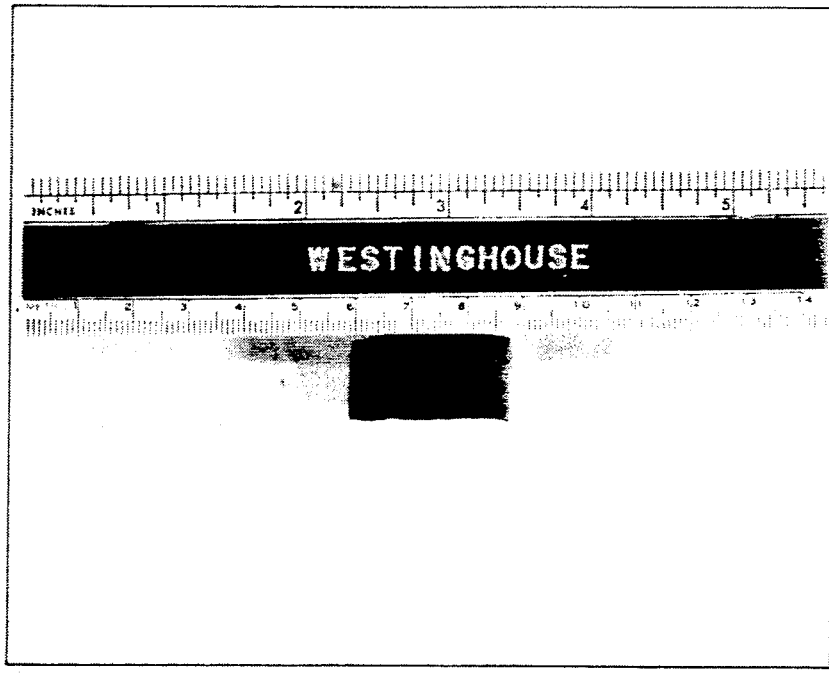
FIG. 4A is a photograph of a $AgTlS_2$ glass of the present invention prepared from an as supplied charge of the present invention.
Figure 4B:
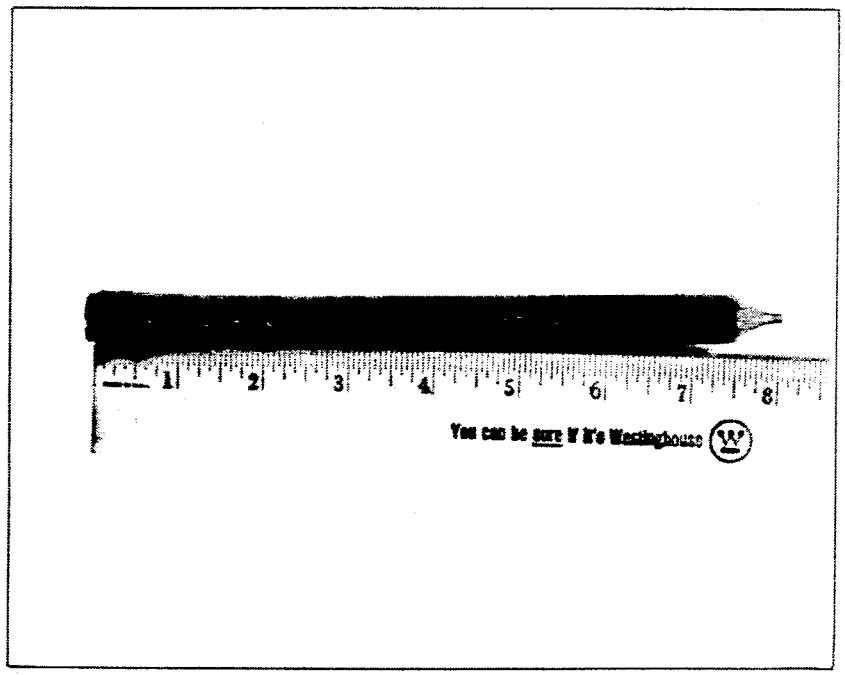
FIG. 4B is a photograph of a $AgTlS_2$ glass.

FIGS. 4A and 4B illustrate the glasses produced from this method.

Figure 5A:
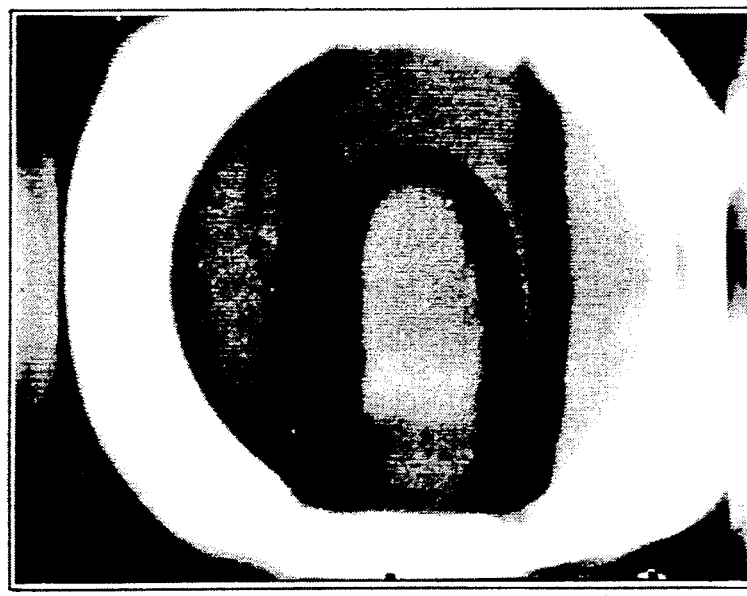
FIG. 5A is a photograph of a 4.5 cm long $AgTlS_2$ glass illustrating the transparency of the glass by showing the image of a paper clip through the $AgTlS_2$ glass.
Figure 5B:
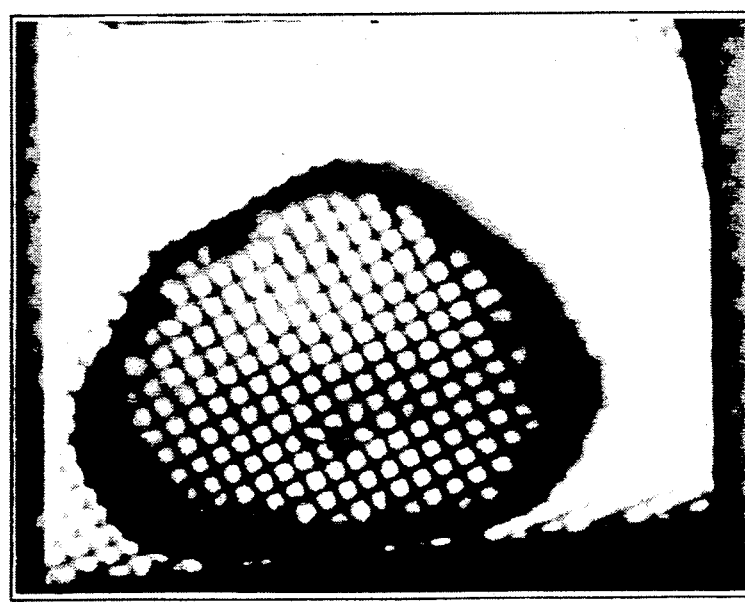
FIG. 5B is a photograph of a 4.5 cm long $AgTlS_2$ glass illustrating the transparency of the glass by showing the image of a 40 mesh screen.
Figure 6:
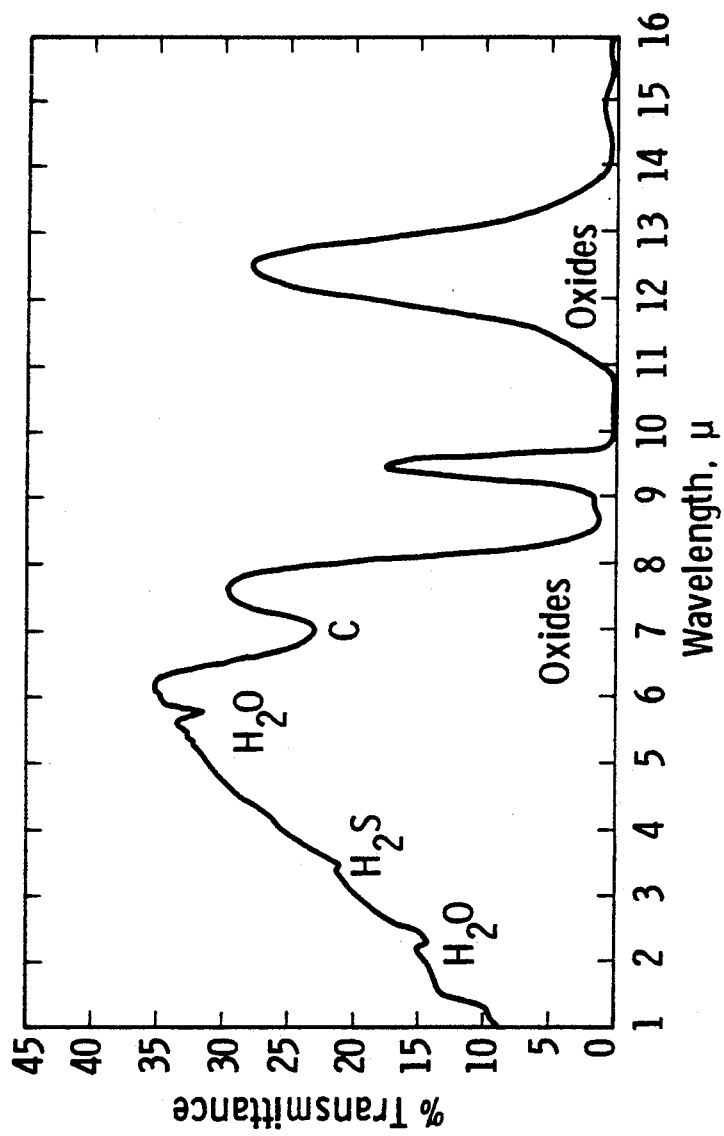
FIG. 6 is a graph showing the infrared transmission of impure $AgTlS_2$ glass.
Figure 7:
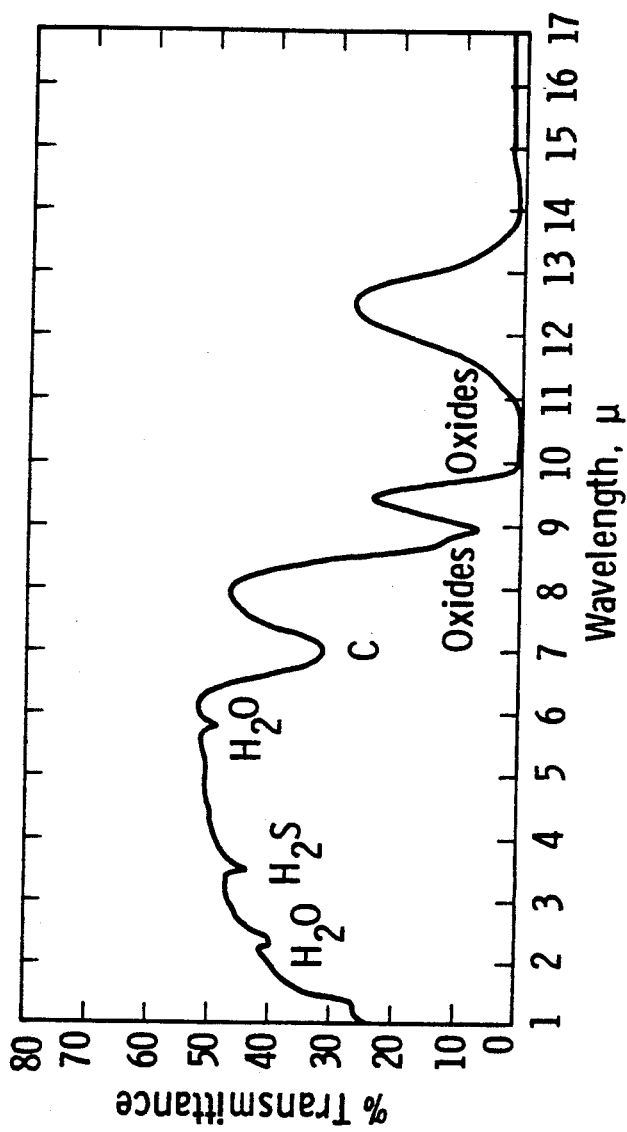
FIG. 7 is a graph showing the infrared transmission of purified $AgTlS_2$ glass.

FIGS. 5A and 5B illustrate the transparency of the glass of the present invention. A paper clip (FIG. 5A) and a metal grid (FIG. 5B) were placed on one end of a glass of the present invention and light that passed through the glass was observed from the other side of the glass.

It will be appreciated that the above described invention provides a chalcogenide glass that has superior properties and transmits well beyond the 12 μm. The composition is preferably prepared from a silver, thallium, and sulfur composition. The chalcogenide glass will be useful in various optical systems.

Whereas particular embodiments of the invention have been described above for purposes of illustration, it will be appreciated by those skilled in the art that numerous variations of the details may be made without departing from the invention as described in appended claims.

We claim:

1. A composition consisting essentially of silver, thallium, and sulfur in a glass-formable ratio of x moles of silver, y moles of thallium, and z moles of sulfur, where $x+y+z$ is about 4 and $z=$about 2x and about 2y.

2. A composition according to claim 1 wherein x is 1, y is 1, and z is 2.

3. A composition consisting essentially of about 1 atomic part silver, about 1 atomic part thallium, and about 1.9 to about 2.3 atomic part sulfur.

4. A glass composition consisting essentially of silver, thallium, and sulfur in a ratio of x moles of silver, y moles of thallium, and z moles of sulfur, where $x+y+z$ is about 4 and $z=$about 2x and about 2y.

5. A glass according to claim 1 wherein x is 1, y is 1, and Z is 2.1.

6. A glass according to claim 4 in the form of a solid having two plane optical surfaces.

7. A glass according to claim 6 wherein said plane optical surfaces are generally parallel.

8. A glass according to claim 6 wherein said solid also has a third plane surface perpendicular to at least one of said two plane optical surfaces.

9. A glass according to claim 8 having a piezo-electric transducer mounted on said third plane surface.

10. A glass according to claim 4 in the form of a fiber.

11. A glass according to claim 10 wherein the ends of said fiber are optical faces perpendicular to said fiber.

12. A glass composition consisting essentially of about 1 mole silver, about 1 mole thallium, and about 1.9 to about 2.3 moles sulfur.

* * * * *